(12) United States Patent
Vondráček

(10) Patent No.: US 12,194,842 B2
(45) Date of Patent: Jan. 14, 2025

(54) AXLE, IN PARTICULAR OF A UNIVERSAL CARRIER FRAME

(71) Applicant: DVOŘÁK—svahové sekačky, s. r. o., Pohled (CZ)

(72) Inventor: Pavel Vondráček, Havlíčkův Brod (CZ)

(73) Assignee: DVOŘÁK—SVAHOVÉ SEKAČKY S.R.O., Pohled (CZ)

( * ) Notice: Subject to any disclaimer, the term of this patent is extended or adjusted under 35 U.S.C. 154(b) by 652 days.

(21) Appl. No.: 17/598,794

(22) PCT Filed: Mar. 3, 2020

(86) PCT No.: PCT/CZ2020/000008
§ 371 (c)(1),
(2) Date: Sep. 27, 2021

(87) PCT Pub. No.: WO2020/192806
PCT Pub. Date: Oct. 1, 2020

(65) Prior Publication Data
US 2022/0169115 A1   Jun. 2, 2022

(30) Foreign Application Priority Data
Mar. 27, 2019  (CZ) .................... CZ2019-185

(51) Int. Cl.
*B60K 17/342* (2006.01)
*B60B 33/00* (2006.01)
(Continued)

(52) U.S. Cl.
CPC .......... *B60K 17/342* (2013.01); *B60B 33/006* (2013.01); *B60K 17/043* (2013.01);
(Continued)

(58) Field of Classification Search
CPC .... B60K 17/30; B60K 17/303; B60K 17/342; B60K 17/043; B60K 2007/0046;
(Continued)

(56) References Cited

U.S. PATENT DOCUMENTS 2,834,605 A    5/1958  Mccollough
3,064,745 A *  11/1962 Colt ...................... B60K 17/30
                                              180/242

(Continued)

FOREIGN PATENT DOCUMENTS

EP    1397267 A1    3/2004
JP    2014103878 A  6/2014

OTHER PUBLICATIONS

ISR for International Application PCT/CZ2020/000008 mailed Jun. 8, 2020.
(Continued)

*Primary Examiner* — Christopher B Wehrly
(74) *Attorney, Agent, or Firm* — LADAS & PARRY LLP

(57) ABSTRACT

An axle in particular of a universal carrier frame, which includes an arm of the axle, a power drive unit, swivel drive units, swivel distribution systems, travel distribution systems. At one end of the arm of the axle, a front portal suspension of a front wheel is rotatably arranged. At the other end of the arm of the axle, a rear portal suspension of the rear wheel is rotatably arranged. The front portal suspension of the front wheel and the rear portal suspension of the rear wheel comprise an angular chain transmission comprising a drive shaft having a longitudinal axis, a driven shaft having a longitudinal axis, a link chain for connecting the drive shaft and the driven shaft, and a pulley angular system of the link chain to define the angle (a) between the longitudinal axis of the drive shaft and the longitudinal axis of the driven shaft.

8 Claims, 6 Drawing Sheets

(51) Int. Cl.
  *B60K 17/04* (2006.01)
  *B60K 17/30* (2006.01)
  *B62D 7/06* (2006.01)
  *F16H 7/06* (2006.01)
  *F16H 7/12* (2006.01)
  *F16H 7/08* (2006.01)

(52) U.S. Cl.
  CPC ............... *B60K 17/30* (2013.01); *B62D 7/06* (2013.01); *F16H 7/06* (2013.01); *F16H 7/1281* (2013.01); *F16H 2007/0806* (2013.01); *F16H 2007/0865* (2013.01); *F16H 2007/0893* (2013.01)

(58) Field of Classification Search
  CPC .. B60K 2007/0084; B60G 5/025; B62D 7/06; B60B 35/001; B60B 33/006; B60B 33/045
  USPC ......................................... 180/253, 255, 411
  See application file for complete search history.

(56) References Cited

U.S. PATENT DOCUMENTS

| | | | |
|---|---|---|---|
| 3,696,881 A * | 10/1972 | Gordon | B62D 5/09 60/471 |
| 4,950,126 A | 8/1990 | Fabiano et al. | |
| 4,964,265 A | 10/1990 | Young | |
| 5,090,185 A | 2/1992 | Meeks | |
| 8,590,664 B2 * | 11/2013 | Terashima | B60K 7/0007 180/6.5 |
| 10,207,403 B1 * | 2/2019 | Wiley | B25J 9/162 |
| 2017/0203652 A1 * | 7/2017 | Ketchel | F16H 7/0827 |

OTHER PUBLICATIONS

Written Opinion for International Application PCT/CZ2020/000008 mailed Jun. 8, 2020.
JP 2014103878 A dated Jun. 9, 2014 _ English Abstract.

* cited by examiner

F-F

AXLE, IN PARTICULAR OF A UNIVERSAL CARRIER FRAME

This application is a national phase entry under 35 USC 371 of International Patent Application No PCT/CZ2020/000008 filed on 3 Mar. 2020, which claims the benefit of CZ Application No. PV 2019-185 filed on 27 Mar. 2019, the entire content of which is incorporated herein by reference.

TECHNICAL FIELD

The invention relates to an axle, in particular of a universal carrier frame.

BACKGROUND OF THE INVENTION

Several types of axles are known from practice.

There are known rigid axles (leaf spring axle, axle with an integrated gerbox and Panhard rod, De Dion axle), further rigid half axles (coupled axle) as well as independent axles (trapezoidal axle, McPherson axle, multilink suspension) etc.

The disadvantages of the above-mentioned axles are, in particular, the large number of unsprung masses and the fact that a large installation space is required.

Several types of rectangular gearboxes are known, which are, for example, a bevel gear, a worm gear, a hypoid gear or an angular planetary gear.

The disadvantages of the prior art gears are, in particular, the need for a large installation space of the wheel suspension in the frame so as to allow unrestricted rotation of the wheel suspension around its longitudinal axis within 360°.

Another disadvantage of these known gears is the high cost of manufacturing sub-components of the axle suspension.

Several types of wheel suspension are known which rotate about their longitudinal axis, but none of the manufacturers provides 360° rotation.

None of the prior art manufacturers provides an axle that includes an angular chain transmission in the wheel suspension that would allow an unlimited range of rotation of the wheel suspension about its longitudinal axis over an angle of 360° with a low installation space and an inexpensive component manufacturing.

It is an object of the present invention to overcome the aforementioned disadvantages of the prior art and to provide a suspension for an axle wheel, in particular for an universal carrier which will be able to transmit drive torque by an angular chain transmission within an unlimited 360° angle around its longitudinal axis of the drive shaft.

It is therefore an object of the present invention to provide a new axle solution, particularly of a universal carrier frame.

SUMMARY OF THE INVENTION

According to the present invention, the above objects have been accomplished by providing an axle, in particular of a universal carrier frame, comprising:
  an axle arm,
  a power drive unit,
  swivel drive units,
  swivel distribution systems,
  travel distribution systems,
  wherein the front portal suspension of the front wheel is rotatably arranged at one end of the axle arm, and the rear portal suspension of the rear wheel is rotatably arranged at the other end of the axle arm.

The front wheel front suspension and the rear wheel rear suspension comprise an angular chain transmission comprising
  a drive shaft having a longitudinal axis,
  a driven shaft having a longitudinal axis,
  a link chain for connecting the drive shaft and the driven shaft,
  and a pulley angular link chain system to define the angle between the longitudinal axis of the drive shaft and the longitudinal axis of the driven shaft.

In a preferred embodiment of the axle according to the invention, the angle between the longitudinal axis of the drive shaft and the longitudinal axis of the driven shaft is in particular 90°.

The pulley angular system is preferably adapted to tighten the link chain.

Accordingly, in accordance with the present invention, the axle with portal wheel suspensions was developed, providing unrestricted 360° rotation.

In each portal suspension, a drive shaft, a driven shaft and a link chain are mounted. The link chain transmits the drive torque of the drive shaft to the driven shaft, the link chain being tensioned by a pulley angular system.

The axle is fitted with portal suspension with wheels, power units and distribution systems.

The distribution systems are preferably selected from the group consisting of belts, driving V-belts, toothed belts, transmission chains, gears and the like.

The drive units are preferably selected from the group consisting of internal combustion engines, hydraulic motors, electric motors and the like.

The solution according to the invention is characterized in particular by the following features:
  the longitudinal axis of the drive shaft in the portal wheel suspension makes an angle with the longitudinal axis of the driven shaft in the portal wheel suspension in particular of 90°,
  the portal wheel suspension due to its mounting into the axle via a bearing flange allows an unrestricted rotation around the longitudinal axis of the drive shaft over an angle range 360°.

BRIEF DESCRIPTION OF THE DRAWINGS

The foregoing and other objects of the present invention will be clarified on the basis of the following detailed description of preferred embodiments of the present invention based on the accompanying drawings, in which.

DETAILED DESCRIPTION OF THE INVENTION

Figure 1:
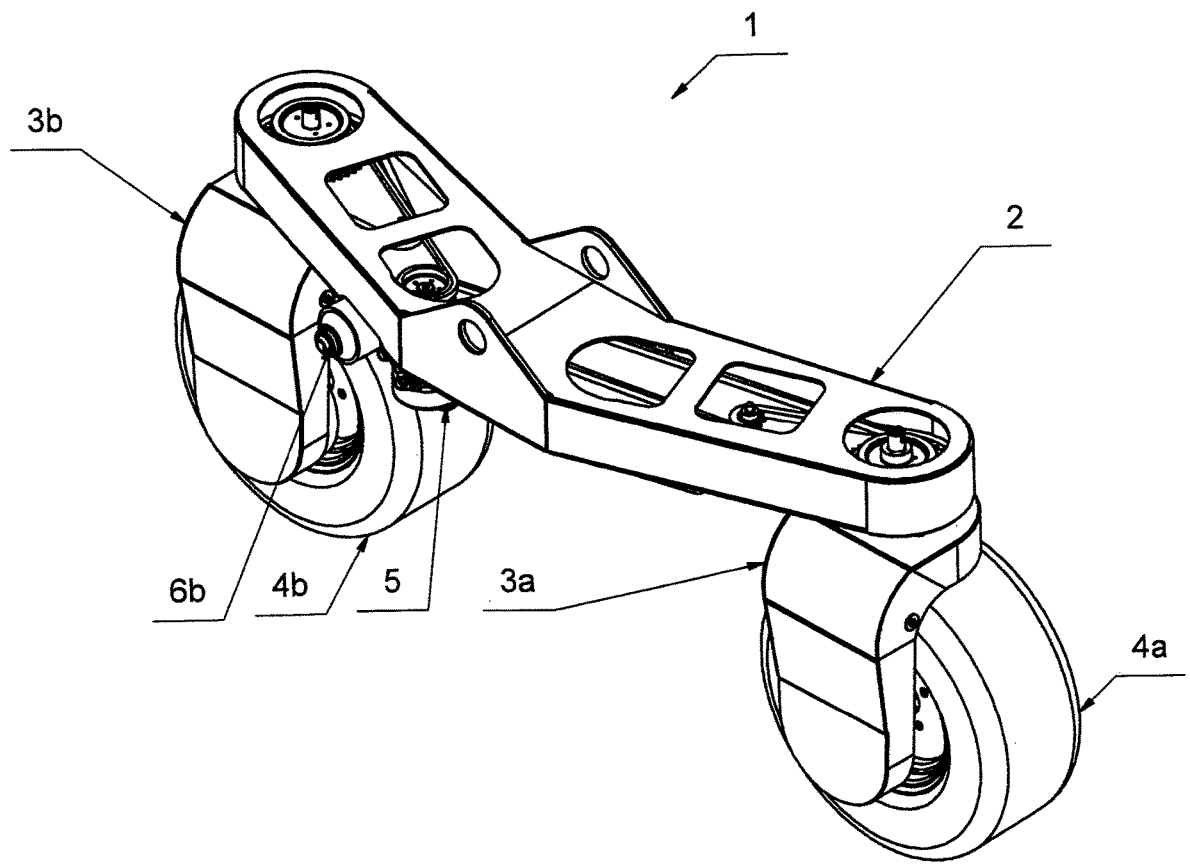
FIG. 1 is an isometric view of an exemplary axle of the present invention.

In accordance with the present invention, the axle with the portal suspension 3a and 3b of the wheels 4a and 4b has been developed, providing unrestricted 360° rotation.

Each portal suspension 3a and 3b accommodates an angular chain transmission 24 comprising a drive shaft 9, a driven shaft 10 and a link chain 11.

The drive chain 11 transmits the drive torque from the drive shaft 9 to the driven shaft 10, the link chain 11 being tensioned by a pulley angle system 12.

On the axle 1, portal suspensions 3a and 3b are provided with wheels 4a and 4b, a power drive unit 5, swivel drive units 6a and 6b, swivel distribution systems 7a and 7b and travel distribution systems 8a and 8b.

The swivel and travel distribution systems 7a, 7b and 8a, 8b are preferably selected from the group consisting of belts, V-belts, toothed belts, transmission chains, gears and the like.

The drive units 5, 6a and 6b are preferably selected from the group consisting of internal combustion engines, hydraulic motors, electric motors and the like.

The solution according to the invention is characterized in particular by the following features for each portal suspension 3a and 3b:

In principle, the vertical longitudinal axis 13 of the drive shaft 9 in the portal wheel suspension 3a and 3b makes an angle with the horizontal axis 14 of the driven shaft 10 in particular of 90°, the portal wheel suspensions 3a and 3b due to its mounting into the axle 1 via a bearing flange 23 allow in principle unrestricted rotation around the longitudinal axis 13 of the drive shaft 9 over an angle range 360°.

For the sake of clarity, it is to be understood that, to explain the features of the present invention, the general terms and technical terms used in the specification and claims generally have the following meanings:

The drive unit is a device for providing the drive torque for an axle and a wheel suspension, generally internal combustion engines, hydraulic motors, electric motors and the like, The distribution system represents mechanical machine elements for providing the transmission of the drive torque, selected from the group consisting of belts, driving V-belts, toothed belts, transmission chains, gears and the like.

A preferred exemplary embodiment of the present invention is shown in the accompanying drawings.

Figure 2:
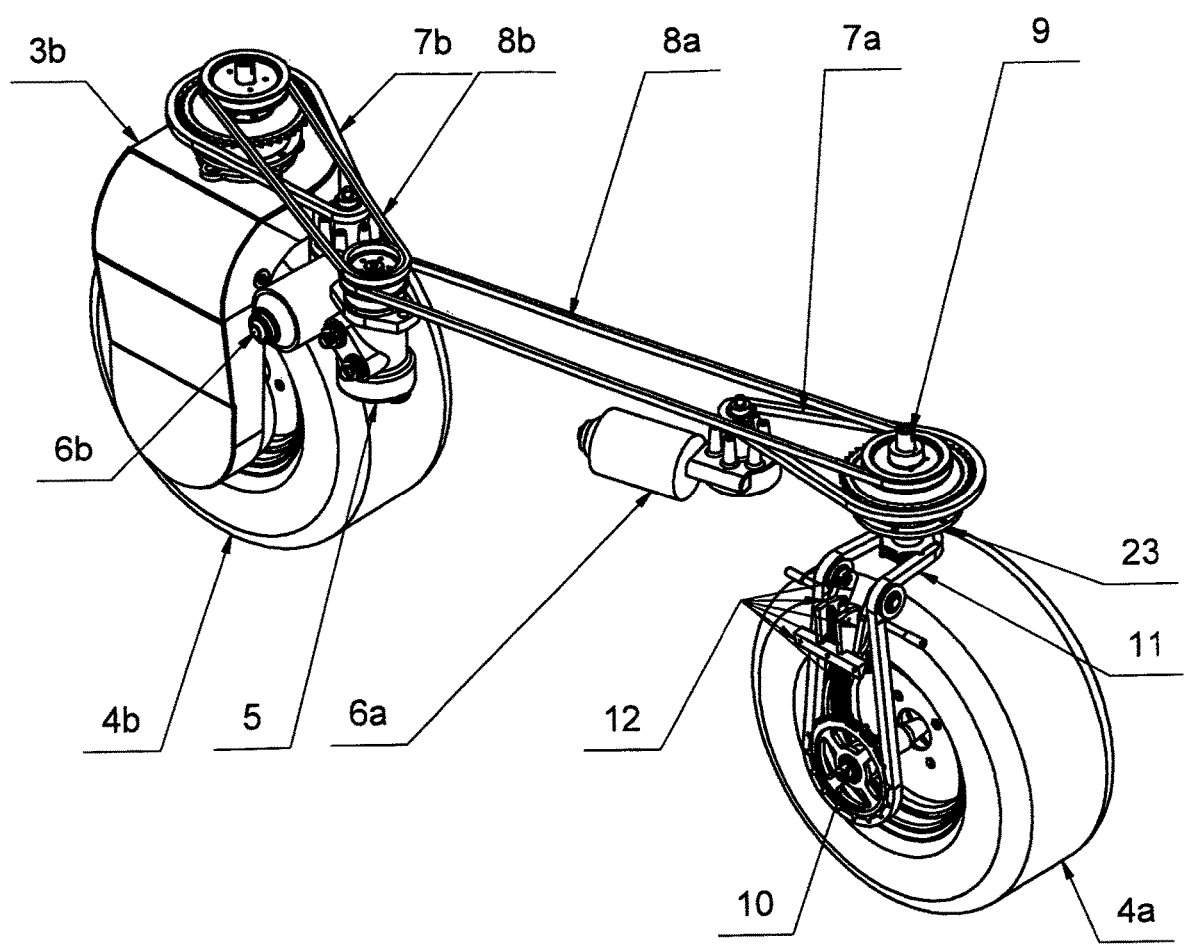
FIG. 2 is an isometric view of an exemplary embodiment of the present invention illustrating transmission of the drive torque and bending torque through swivel distribution systems to the front and rear wheels of the portal suspensions.
Figure 3:
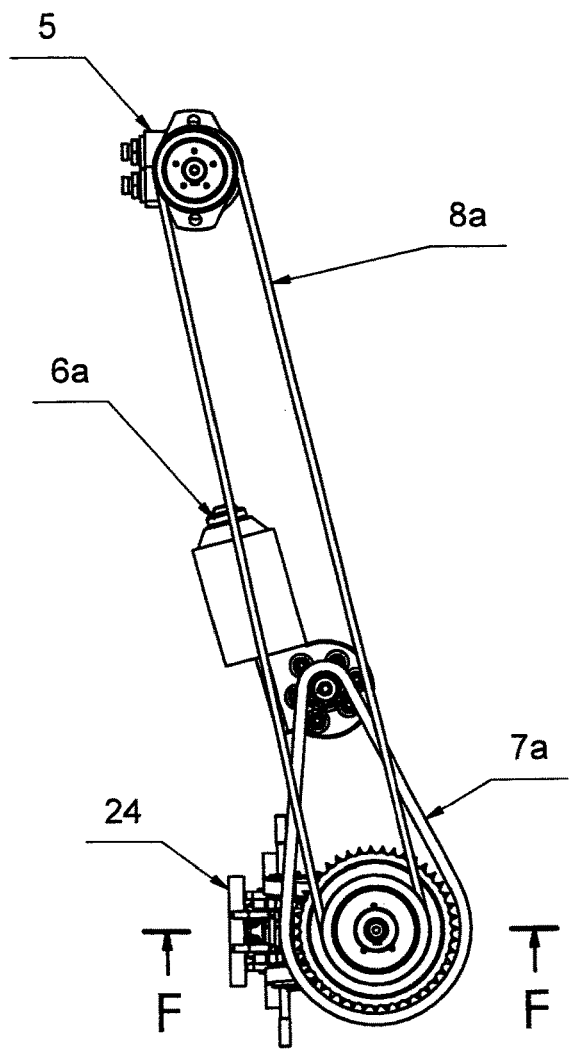
FIG. 3 is a perspective view of a simplified exemplary embodiment of the present invention illustrating the transmission of the bending torque and the drive torque to the front wheel of the portal suspension.
Figure 4:
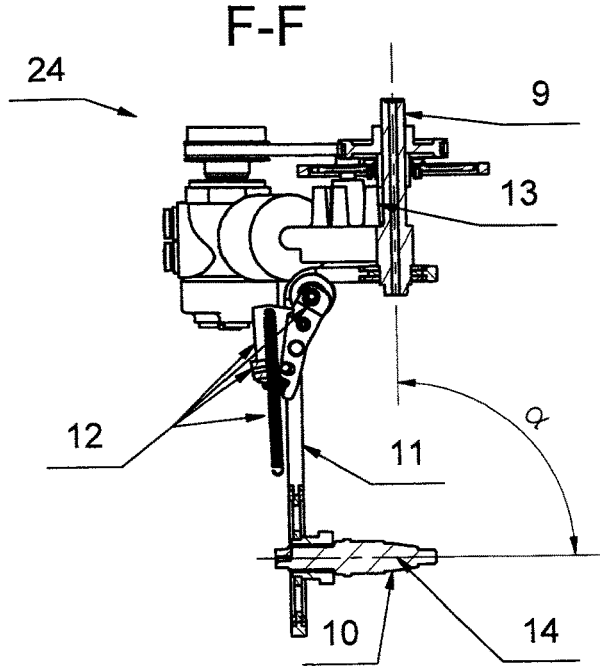
FIG. 4 is a cross-sectional view taken along line F-F in FIG. 3 of an exemplary embodiment of the present invention.
Figure 5:
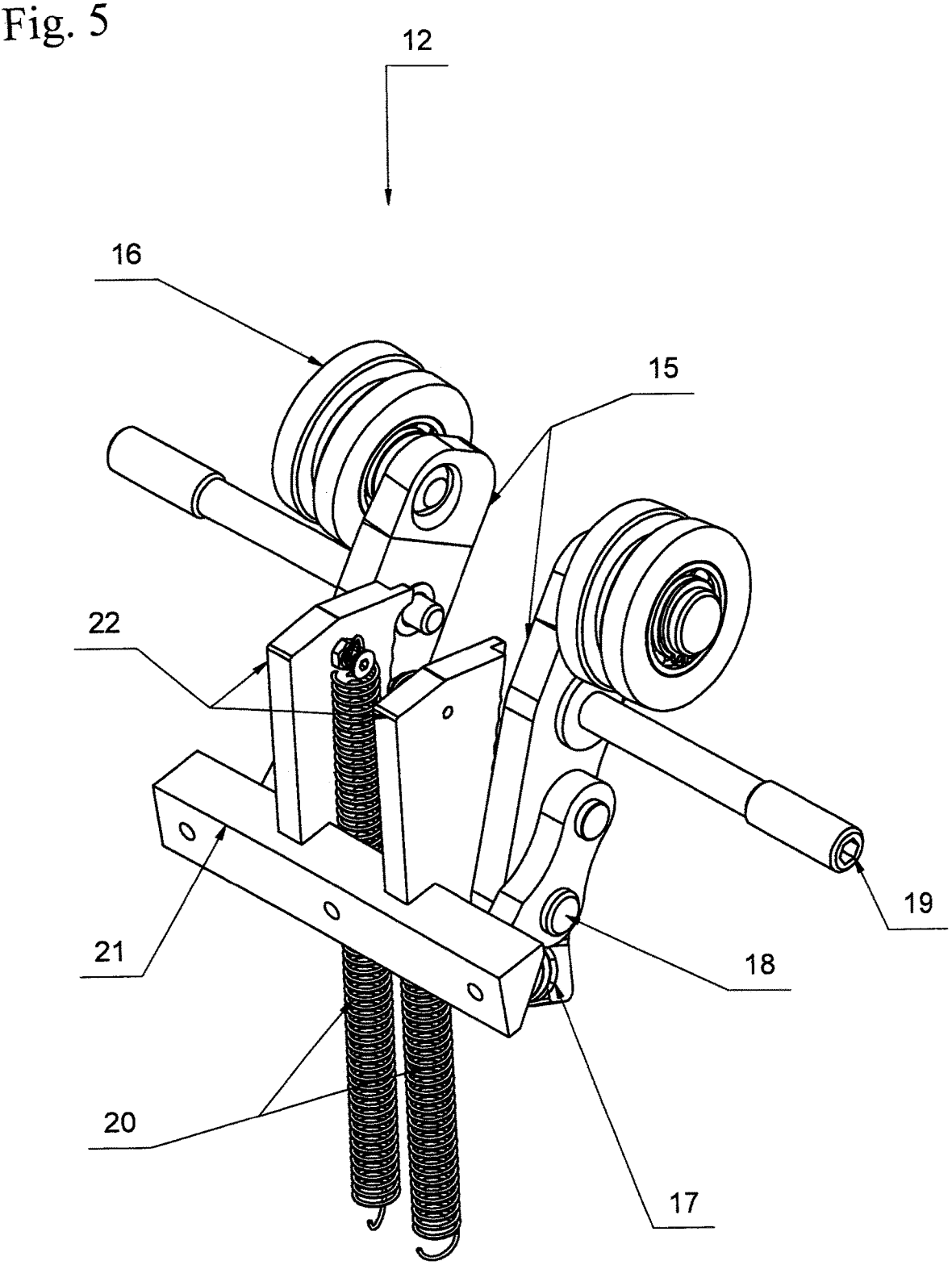
FIG. 5 is an isometric view of a pulley angular link chain system according to an exemplary embodiment of the present invention.
Figure 6:
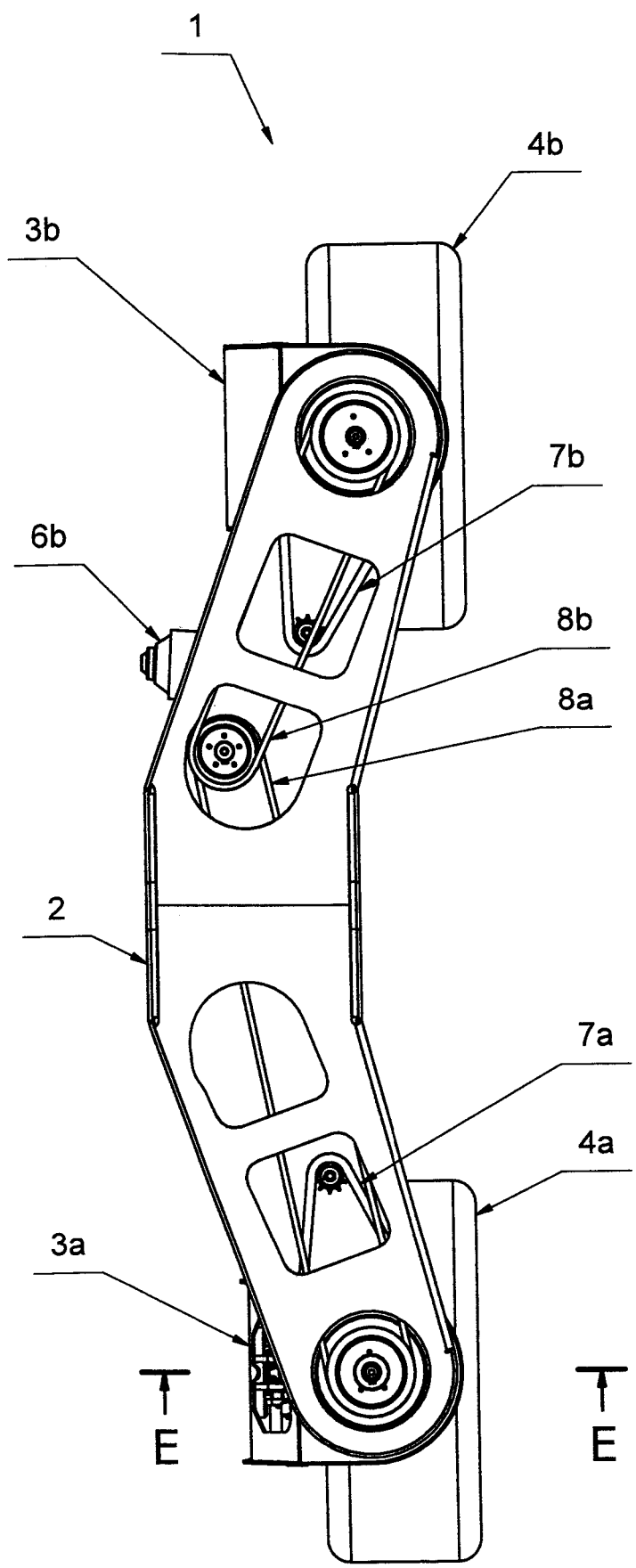
FIG. 6 is a top view of an exemplary embodiment of the present invention.
Figure 7:
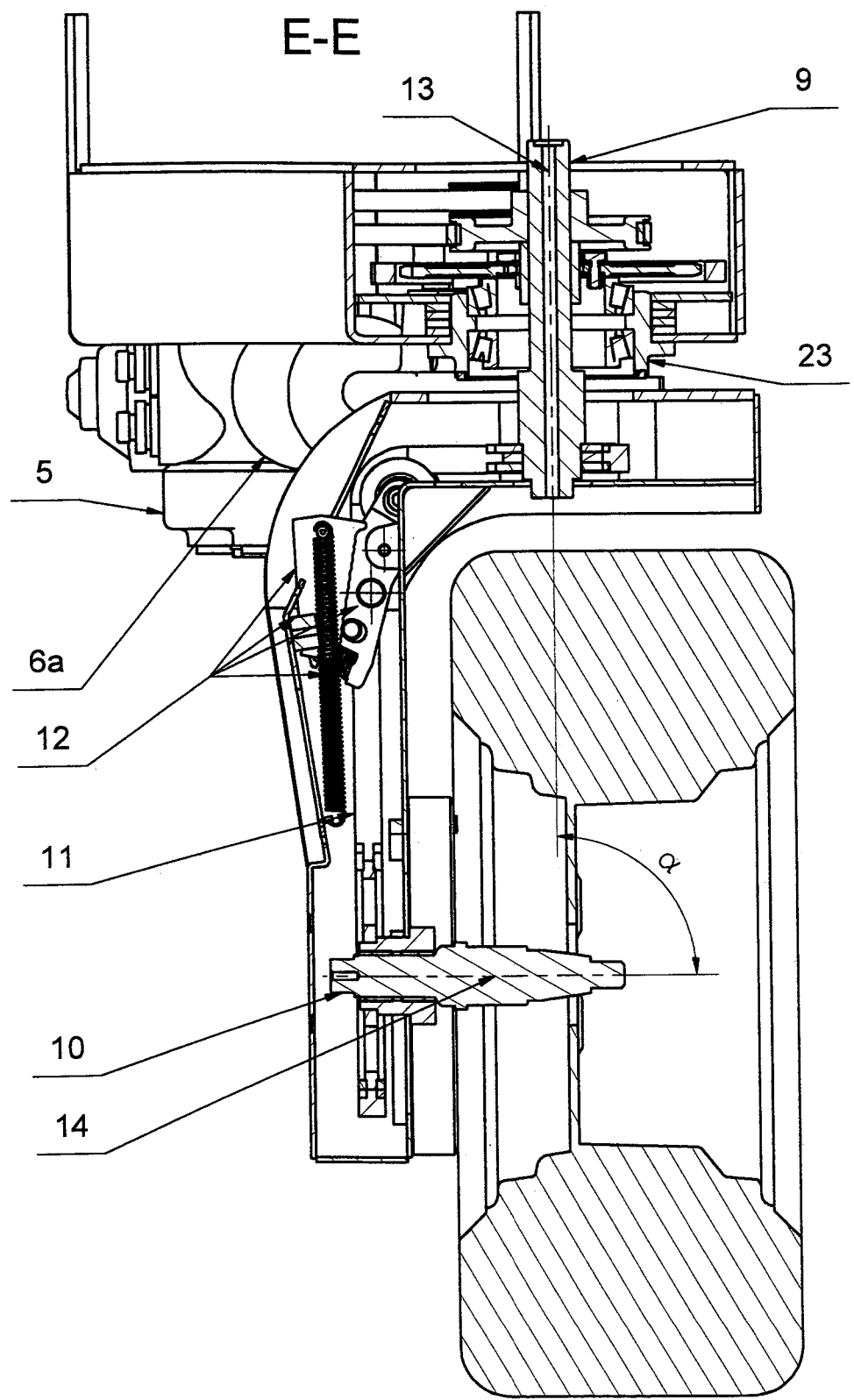
FIG. 7 illustrates a cross-sectional view taken along the line E-E of FIG. 6 to an exemplary construction of the present invention.

As shown in FIGS. 1 to 7, the axle 1, in particular of a universal carrier frame, bears the arm 2 of the axle 1, which may be, for example, a welded housing in which
the swivel drive unit 6a of the front wheel 4a,
the swivel drive unit 6b of the rear wheel 4a,
the power unit 5, are mounted.

These units may be, for example, electric motors, hydraulic motors and the like.

The front portal suspension 3a and the rear portal suspension 3b allow unrestricted 360° rotation by means of the swivel distribution systems 7a and 7b, which may be, for example, chain and belt torque distributions.

The drive torque for travel of the front wheel 4a is further distributed by the travel distribution system 8a of the front wheel 4a to the driven shaft 10 of the front wheel 4a.

In the arm 2 of the axle 1, the front portal suspension 3a is mounted at one end and the rear portal suspension 3b is mounted at the other end, both of which comprising a bearing flange 23, wherein the mounting thereof in the axle 1 provides an unrestricted 360° rotation about the longitudinal axis 13 of the drive shaft 9.

Each portal suspension 3a and 3b comprises an angular chain transmission 24 comprising a drive shaft 9 and a driven shaft 10 which, by means of a link chain 11, transmit the drive torque from the power drive unit 5, which is formed, for example, by a hydraulic motor.

The substantially vertical longitudinal axis 13 of the drive shaft 9 makes an angle α of 90° with the substantially horizontal longitudinal axis 14 of the driven shaft 10.

The link chain 11, which transmits the drive torque from the drive shaft 9 to the driven shaft 10, is tensioned by a pulley angular system 12.

The pulley angular system 12 according to the invention is formed, for example, by a pair of tensioning levers 15 with a pulley 16, which are mounted by means of a pin 19 in the portal suspensions 3a and 3b, the tensioning lever 15 allowing a rotary motion.

The pulley angular system 12 of the link chain 11 comprises a pair of wedges 22 that press against the fitting pin 18 of the tensioning lever 15.

Each wedge 22, housed in the guide bar 21, is secured by one tension spring 20, which is engaged in a respective portal suspension 3a, 3b.

The tension lever 15 comprising a pulley 16 further comprises a locating compression spring 17 which determines the tension of the link chain 11. The tension lever 15 is connected to the given portal suspension 3a and 3b by a pin 19.

Upon loosening the link chain 11, one of the tensioning wedges 22 housed in the guide bar 21 is lowered by the force of one of the compression springs 20. The fitting pin 18 transmits the above movement and tilts the tensioning lever 15 in order to tension the link chain 11 and to create an optimal tension clearance of the link chain 11.

The pulley angular system 12 of the link chain 11 comprises a compression spring 17 on the tensioning lever 15, which ensures optimum tension of the link chain 11.

INDUSTRIAL APPLICABILITY

According to the present invention, the axle has been developed, at the ends of which the portal suspensions are located, which by their mounting via the bearing flange and by means of swivel drive units allow unrestricted rotation about their longitudinal axis of the drive shaft within the angle of 360°.

The axle further includes a power drive unit that distributes drive torque over the distribution system to the drive shaft.

Each portal suspension comprises an angular chain transmission comprising a drive shaft and a driven shaft spaced at an angle of 90° to each other, the drive torque being transmitted by means of a link chain with a tensioning system.

The invention has solved a low installation space for an axle using an angular chain transmission in the portal suspension of the wheel, and hence the use of low cost elements.

The invention has solved the unrestricted rotation of the portal wheel suspension in the axle within an angle of 360°.

The angular chain transmission axle in the wheel suspension according to the invention finds an application, for example, in frames of cars or universal carriers.

LIST OF REFERENCE NUMERALS

1—axle
2—arm 2 of the axle 1
3a—front portal suspension
3b—rear portal suspension
4a—front wheel 4a of the front portal suspension 3a
4b—rear wheel 4b of the rear portal suspension 3b
5—power drive unit
6a—swivel drive unit 6a of the front wheel 4a
6b—swivel drive unit 6a of the rear wheel 4b
7a—swivel distribution system 7a of the front wheel 4a
7b—swivel distribution system 7b of the rear wheel 4b
8a—travel distribution system 8a of the front wheel 4a
8b—travel distribution system 8b of the rear wheel 4b
9—drive shaft
10—driven shaft
11—link chain
12—pulley angular system 12 of the link chain 11
13—longitudinal axis 13 of the drive shaft 9
14—longitudinal axis 14 of the driven shaft 10
15—tensioning lever
16—pulley
17—compression spring
18—fitting pin
19—pin
20—tension spring
21—guide bar
22—wedge
23—bearing flange
14—angular chain transmission
α—angle α between the longitudinal axis 13 of the drive shaft 9 and the longitudinal axis 14 of the driven shaft 10

The invention claimed is:

1. An axle comprising:
(a) an arm having first and second ends;
(b) a front portal suspension disposed at the first end of the arm;
(c) a rear portal suspension disposed at the second end of the arm; wherein each of the front portal suspension and the rear portal suspension comprises an angular chain transmission;
wherein the angular chain transmission of each of the front portal suspension and the rear portal suspension comprises (i) a drive shaft having a longitudinal axis, (ii) a driven shaft having a longitudinal axis, (iii) a link chain for connecting the drive shaft and the driven shaft, and (iv) a pulley angular system tensions the link chain and defines an angle ($\alpha$) between the longitudinal axis of the drive shaft and the longitudinal axis of the driven shaft.

2. The axle according to claim 1, comprising a front wheel rotatably arranged in the front portal suspension and a rear wheel rotatably arranged in the rear portal suspension.

3. The axle according to claim 2, wherein the axle comprises a power drive unit for providing drive torque and means for distribution of the drive torque from the power drive unit to the front and rear portal suspensions.

4. The axle according to claim 3, wherein the means for distribution comprises swivel drive units, swivel distribution systems and travel distribution systems.

5. The axle according to claim 3, wherein the drive unit is selected from the group consisting of internal combustion engines, hydraulic motors and electric motors, and the means for distribution comprises distribution systems selected from the group consisting of belts, driving V-belts, toothed belts, transmission chains and gears.

6. The axle according to claim 1, wherein the angle ($\alpha$) between the longitudinal axis of the drive shaft and the longitudinal axis of the driven shaft of each of the front portal suspension and the rear portal suspension is 90°.

7. The axle according to claim 1, wherein each of the front portal suspension and the rear portal suspension comprises a bearing flange, and wherein the front portal suspension and rear portal suspension are mounted on the axle to provide unrestricted 360° rotation about the respective longitudinal axes of the drive shafts of the respective front and rear portal suspensions.

8. A universal carrier frame comprising the axle according to claim 1.

* * * * *